B. H. ARNOLD.
CONTROL OF ELECTRIC CIRCUITS.
APPLICATION FILED NOV. 7, 1917.
1,273,719.
Patented July 23, 1918.
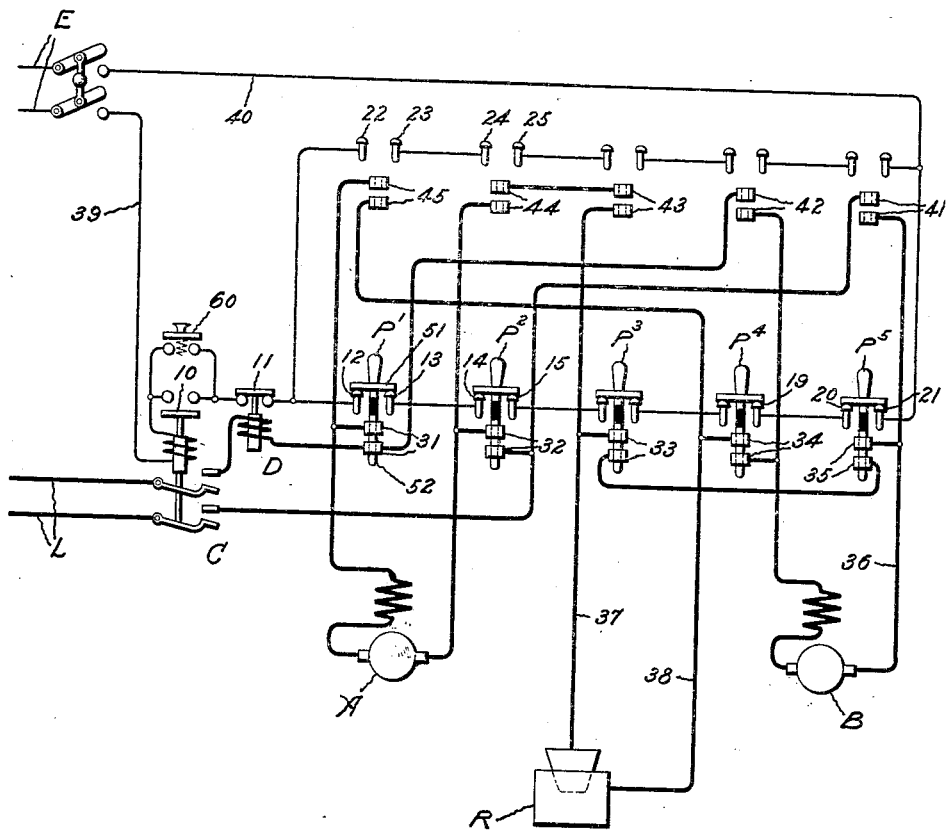
Inventor:
Benjamin H. Arnold,
by Albert G. Davis
His Attorney.

UNITED STATES PATENT OFFICE.

BENJAMIN H. ARNOLD, OF ERIE, PENNSYLVANIA, ASSIGNOR TO GENERAL ELECTRIC COMPANY, A CORPORATION OF NEW YORK.

CONTROL OF ELECTRIC CIRCUITS.

1,273,719.     Specification of Letters Patent.     Patented July 23, 1918.

Application filed November 7, 1917. Serial No. 200,717.

*To all whom it may concern:*

Be it known that I, BENJAMIN H. ARNOLD, a citizen of the United States, residing at Erie, county of Erie, in the State of Pennsylvania, have invented certain new and useful Improvements in the Control of Electric Circuits, of which the following is a specification.

My invention relates to means for controlling electric circuits and has for its object the provision of improved means whereby the opening of power circuits is effected under safe conditions and the possibility of making improper circuit connections reduced to a minimum.

In certain cases where power circuit connections must be changed quickly and often as for instance in the testing of dynamo-electric machinery it has heretofore been customary to make the connections through manual or plug switches which can be easily changed, the circuits being made and broken directly at the plug switches. When the energy of the circuit controlled is relatively large, the plug switches are not well adapted for controlling them directly. Moreover it is possible to make the wrong connections and thereby cause considerable damage. In carrying out my invention I employ in connection with the plug switches electromagnetic switch mechanism which is well adapted for the opening of heavy currents and which makes it possible to interlock the switches against improper operation. In one form of my invention I employ a single electromagnetic switch or contactor which always breaks the circuit thereby taking the arcing away from the plug switches. I also employ auxiliary switches associated with the main switches for insuring against the making of improper connections.

Other objects and purposes of this invention will appear and a complete understanding thereof may be had from the following detailed description when taken in connection with the accompanying drawing in which I have shown one embodiment of my invention in diagrammatic fashion.

In the accompanying drawing A denotes a dynamo electric machine which may be operated either as a motor or generator but in the instance shown is connected as a motor for driving a similar machine B as a generator, machine B operating as a motor when machine A is a generator; there being mechanical driving connections coupling the two machines together.

Motor A is connected in a circuit supplied with electric energy from the line conductors L by the plugs $P_1$ and $P_2$ inserted respectively in switch rings at 31 and 32.

Generator B is connected in a similar manner by the plugs $P_3$, $P_4$ and $P_5$ to supply power to the adjustable resistance or water rheostat R.

C denotes a double pole line switch or contactor having its electromagnetic winding or coil in the control circuit for controlling the supply of power to the motor circuit and in series with the plug switches thereof. An overload relay D is also placed so that its coil is in series in the motor circuit. These relays operate auxiliary switches 10 and 11 respectively which are also in series in the control circuit supplied with electric energy from any suitable source such as the busses at E. This control circuit has two branches, one for the machines A and B when operating as motor and generator, the other for the alternate connection of the machines, each branch having contacts, such as 12, 13, 14, 15—22, 23, etc., adjacent the switch rings 31, 32, 33—41, 42, etc., which contacts are bridged by conducting members such as disks 51 carried on the insulated portion of the plugs, for completing the control circuit when the plugs $P_1$, $P_2$, $P_3$, $P_4$ and $P_5$ are plugged in the proper sequence, for operating the machines A and B either as motor and generator, or vice versa.

The plugs shown also have the conducting portion 52 insulated from disk 51, which portion is designed to place a pair of switch rings in conducting relation when the plugs have been inserted, and to be of such length that these rings continue in conducting relation when the plug is partially withdrawn so that the control circuit is first broken.

The operation of this form of my invention is as follows:

Assuming that it is desired to operate machine A as a motor and machine B as the generator, plugs $P_1$, $P_2$ would be inserted in the switch rings at 31 and 32 respectively. This enables current to flow from one side of line L through the coil of relay D, when relay C has closed the line switches, thence to the rings 31 which are now bridged by portion 52 of plug $P_1$, thence to motor A, thence to rings 32 which are bridged by plug P₂ and thence back to the line.

Plugs P₃, P₄ and P₅ would also be inserted in switch rings 33, 34 and 35 respectively so that current generated in machine B could flow through conductor 36, rings 35, thence to rings 33, conductor 37 through rheostat R, conductor 38, rings 34 and then back to the generator B.

When plugs P₁, P₂, P₃, P₄ and P₅ are plugged in as above described, the disks 51 will bridge all the contacts in one branch of the control circuit enabling the relay C to be energized for closing the line switches when switch 60 is closed, as follows:

From one of the busses at E current would flow through conductor 39, the coil of contactor C, the switch 60, auxiliary switch 11, thence to contacts 12 and 13 which are bridged by disk 51 on plug P, and thence through the contacts 14 to 21, bridged by the other plugs, thence through conductor 40 back to other bus at E. After the coil of contactor C is energized the line switch controlling the current to the motor will close and also close auxiliary switch 10 which is in parallel to switch 60, so that this latter switch need be but momentarily closed.

The motor A will now drive machine B as a generator until the overload relay D should open the control circuit or one of the plugs be removed in which case the coil of relay C would be deënergized and the line switches opened as soon as disk 51 left its contacts and before the plug is fully removed, thereby stopping the motor without dangerous arcing.

When it is desired to operate machine B as the motor and machine A as the generator, plugs would be inserted in rings 41, 42, 43, 44 and 45, so that when the switch 60 is now momentarily closed, current would energize the coil of relay C, to close the line switches in the same manner as above described.

When machine B drives machine A as a generator, it will continue to operate as a motor until the overload relay D should operate or one of the plugs be removed to open the control circuit, which would deënergize the coil of relay C in either case to open the line to the motor B only through the instrumentality of the line switches in the same manner as when machine A was the motor.

It is thus seen that any arrangement of the plugs other than one in which machines A and B operate as motor and generator or vice versa or the failure to push one of the plugs home would fail to make a complete control circuit which could be closed by switch 60 thereby preventing the machine which is to be operated as a motor from starting.

Having now described an embodiment of my invention which is at present the best means known to me for carrying the same into effect, I would have it understood that this is merely illustrative and that I do not mean to be limited to the exact details shown nor in the choice of recognized equivalents except as set forth in my claims hereunto appended.

What I claim as new and desire to secure by Letters Patent of the United States is:

1. The combination with a circuit to be controlled, of manually operated switches for making the various connections for said circuit, an electromagnetic switch controlling said circuit and in series with said manual switches and means for causing said electromagnetic switch to break said circuit when any of said manual switches are opened but before its contacts are separated.

2. The combination with a circuit to be controlled, of manually operated switches for making the various connections for said circuit, an electromagnetic switch controlling said circuit and in series with said manual switches and a control circuit for operating said electromagnetic switch arranged to be broken when any of said manual switches are opened but before its contacts are separated.

3. The combination with a circuit to be controlled, of manually operated switches for making the various connections for said circuit, an electromagnetic switch controlling said circuit and in series with said manual switches and a control circuit for operating said electromagnetic switch having contacts adjacent each manual switch arranged to be independently bridged by said manual switches but opened before the main switch contacts separate.

4. The combination with a plurality of circuits to be controlled, of manually operated switches for making the various connections in said circuits, an electromagnetic switch controlling the power supply connected in series with one of said circuits and means for causing said electromagnetic switch to break said circuit when any of said manual switches are opened but before its contacts are separated.

5. The combination with a plurality of circuits, of plug switches for making the various connections in said circuits, an electromagnetic switch controlling the power supply connected by said plugs in one of said circuits and a control circuit for operating said electromagnetic switch having contacts associated with each plug switch arranged to be independently bridged thereby but opened upon removal of a plug before its main contacts are separated.

6. The combination with a plurality of circuits, of plug switches for making the various connections in said circuits, an electromagnetic switch controlling the power supply connected by said plugs in one of said circuits and a control circuit for operating said electromagnetic switch having contacts associated with each plug switch and conducting disks on an insulated portion of the plugs for said plug switches for completing said control circuit but arranged to be opened upon removal of a plug before the main contacts separate.

7. The combination with a plurality of circuits, of plug switches for making the various connections in said circuits, an electromagnetic switch controlling the power supply connected by said plugs in one of said circuits and a control circuit for operating said electromagnetic switch having contacts associated with each plug switch, said control circuit having branches so distributed that an operative circuit is completed by said plug switches only when connecting said first mentioned circuits in proper relation.

8. The combination with a plurality of circuits to be controlled, of manually operated switches for making the various connections in said circuits, an electromagnetic switch controlling the power supply connected in series with one of said circuits, an overload relay having its coil in series with said electromagnetic switch and a control circuit for operating said electromagnetic switch having a switch operated by said relay and contacts associated with each manual switch arranged to be bridged thereby.

9. The combination with a plurality of circuits to be controlled, of manually operated switches for making the various connections in said circuits, an electromagnetic switch controlling the power supply connected in series with one of said circuits, a dynamo-electric machine in each circuit, an overload relay having its coil in series with said electromagnetic switch and a control circuit having auxiliary switches in series operated by said electromagnetic switch and said relay, a starting switch in parallel with the auxiliary electromagnetic switch and contacts associated with each manual switch arranged to be bridged thereby.

In witness whereof, I have hereunto set my hand this third day of November, 1917.

BENJAMIN H. ARNOLD.

Copies of this patent may be obtained for five cents each, by addressing the "Commissioner of Patents, Washington, D. C."